P. M. MARKO.
STORAGE BATTERY.
APPLICATION FILED MAR. 14, 1918.
1,329,917.
Patented Feb. 3, 1920.
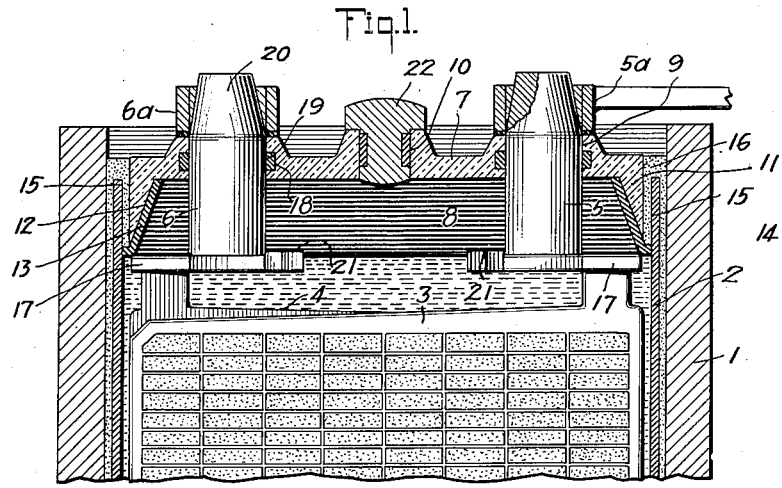
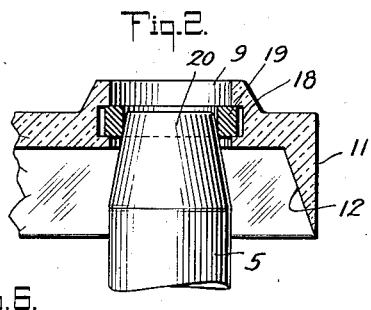
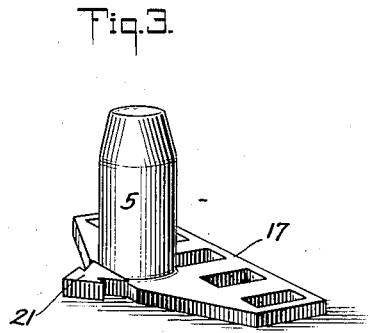
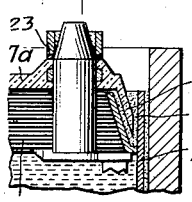
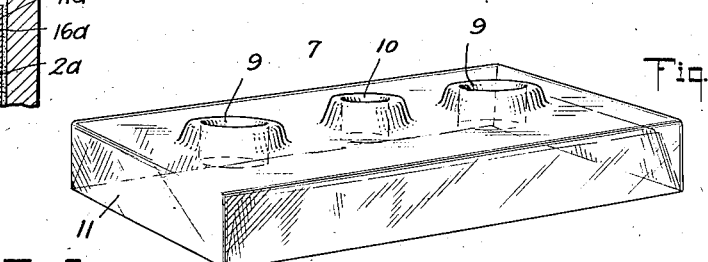
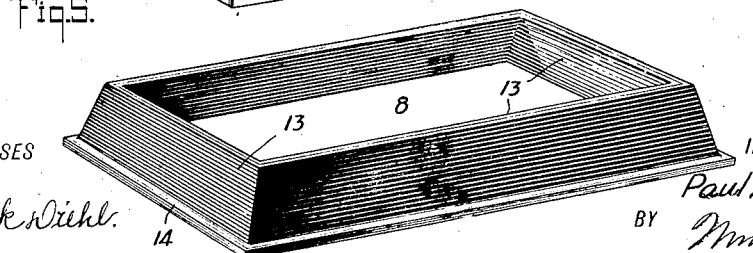
WITNESSES
INVENTOR
Paul M. Marko
BY
ATTORNEYS

UNITED STATES PATENT OFFICE.

PAUL M. MARKO, OF BROOKLYN, NEW YORK.

STORAGE BATTERY.

1,329,917.          Specification of Letters Patent.          Patented Feb. 3, 1920.

Application filed March 14, 1918. Serial No. 222,306.

*To all whom it may concern:*

Be it known that I, PAUL M. MARKO, a citizen of the United States, and a resident of the city of New York, borough of Brooklyn, in the county of Kings and State of New York, have invented a new and Improved Storage Battery, of which the following is a full, clear, and exact description.

This invention relates to storage batteries and relates particularly to an improved cover and to level indicating means for the electrolyte.

The principal object of the invention is to provide an improved cover which is made of glass or other transparent material so as to permit the level of the electrolyte to be easily ascertained at any time without removing the filling plug, which is now necessary with opaque covers, and also to facilitate the filling of the battery from time to time so that the proper amount of liquid can be supplied without danger of overflow with the attendant evils.

A more specific object of the invention is the provision of a single-piece glass cover for a battery case with a novel sealing and supporting frame for the cover, the same frame being adapted to rest upon the plate straps of the terminal posts.

Still another object of the invention is the provision of novel means for forming a liquid-tight joint between the glass cover and terminal posts.

An additional object is to provide a novel form of level indicator on the terminal posts.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a vertical sectional view of the upper portion of a battery, showing the improved cover;

Fig. 2 is a detail view of the cover, showing the relation of the cover with a terminal post as the cover is about to be applied;

Fig. 3 is a perspective view of one of the terminal posts, plate straps and level indicators;

Fig. 4 is a perspective view of the glass cover removed;

Fig. 5 is a perspective view of the sealing frame or holder for the cover; and

Fig. 6 is a detail view of a modified form of cover.

Referring to the drawing, 1 designates the battery box, 2 the casing or shell therein, 3 and 4 the two sets of plates, 5 and 6 terminal posts, 7 the glass cover, and 8 the frame for sealing in and supporting the cover.

The glass cover 7 is a single piece of pressed or molded glass or equivalent material which has openings 9 for the terminal posts and a filling opening 10, and which also has a depending marginal flange or rim 11, the inner wall of which is beveled as shown at 12 in Figs. 1 and 2. This cover rests on the frame 8, which is made of hard rubber or equivalent material, the four walls 13 of which are inclined to correspond with the bevel 12 of the cover flange, and at the bottom of the frame is a peripheral flange 14 which projects beyond the cover at all four sides and engages the walls of the battery casing 2, so as to form a bottom for the space 15 between the glass cover and the casing 2. Into this space 15 is poured a sealing compound 16 which effectively seals the cover in place as well as sealing the casing 2 in the box 1. The frame 8 rests on the straps 17 of the binding posts.

The openings 9 of the cover are provided with annular grooves 18 for receiving soft rubber packing rings 19 which are normally of smaller diameter than the annular groove 18, as shown in Fig. 2, and when the tapered upper end 20 of the terminal post is passed through the opening 9 of the cover, by the placing of the latter in position, the packing ring 19 is expanded into the groove. When the terminal links 5ª and 6ª are applied to the terminal posts 5 and 6 and soldered thereto, the heat developed will vulcanize the packing rings 19, so that a fluid-tight joint is obtained.

The glass cover 7 is transparent, so that the level of the electrolyte in the battery can be seen, and to facilitate the ascertaining of the proper level, arrow-heads or other indicators 21 are cast integral with the bases of the terminal posts, as shown in Figs. 1 and 3. These arrows are at the opposite side of the terminal post from the strap 17 and can be seen through the central region of the glass cover without the necessity of removing the filling plug 22.

In the construction shown in Fig. 6, the depending flange 11$^a$ of the cover 7$^a$ is beveled both on its inner and outer surfaces, and the frame 8$^a$ is of such size that the sealing material 16$^a$ will lie between the walls of the frame 8 and the flange 11$^a$, as well as between said flange 11$^a$ and the battery case 2$^a$. In other words, the sealing material serves as a cushion between the cover 7$^a$ and frame 8$^a$ between the terminal links and glass cover, which rubber washers 23, in addition to serving as sealing means, constitute cushions between the terminal links and the glass cover, so that the latter will be cushioned effectively, and liability to breakage of the glass is accordingly reduced to a minimum.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a battery case, a glass cover therefor having openings, each opening having a groove extending around the same, a rubber ring set in the groove and normally of less diameter than the diameter of the groove, and terminal posts having tapered upper ends whereby the rings are expanded as the cover is slipped downwardly on the posts, and linked terminals soldered to the outer ends of the posts.

2. The combination of a battery case, a plate structure therein, a cover-holding frame resting on the plate structure, a cover having a depending flange lying between the frame and case, and a sealing compound lying between the flange and frame and between the flange and case.

3. The combination of a battery case, a plate structure therein, a cover-holding frame resting on the plate structure, a cover having a depending flange lying between the frame and case, and a sealing compound lying between the flange and frame and between the flange and case, said plate structure having terminal posts passing through the cover, terminal links on the posts, and cushioning rings between the cover and terminal links and surrounding the said posts.

4. The combination of a case, a frame forming a channel with the case, a cover having its margin disposed in the channel, and a sealing material holding the cover out of contact with the frame and case.

5. In a storage battery, a battery case, a glass cover therefor having openings, these openings having a groove extending around the same, a rubber ring set in the groove, said ring being normally of less diameter than the diameter of the groove, and terminal posts having tapered upper ends whereby the rings are expanded as the cover is slipped downwardly on the posts.

6. In a storage battery, a battery case, plates therein, a cover holding frame resting on said plates, said cover having a depending flange lying between the frame and the case, a sealing compound disposed between the flange and the frame and between the flange and the case.

PAUL M. MARKO.